E. H. JOHNSON.
IMPLEMENT FOR BEATING EGGS, WHIPPING CREAM, OR FOR MIXING INGREDIENTS.
APPLICATION FILED NOV. 8, 1909.
1,025,982.
Patented May 14, 1912.
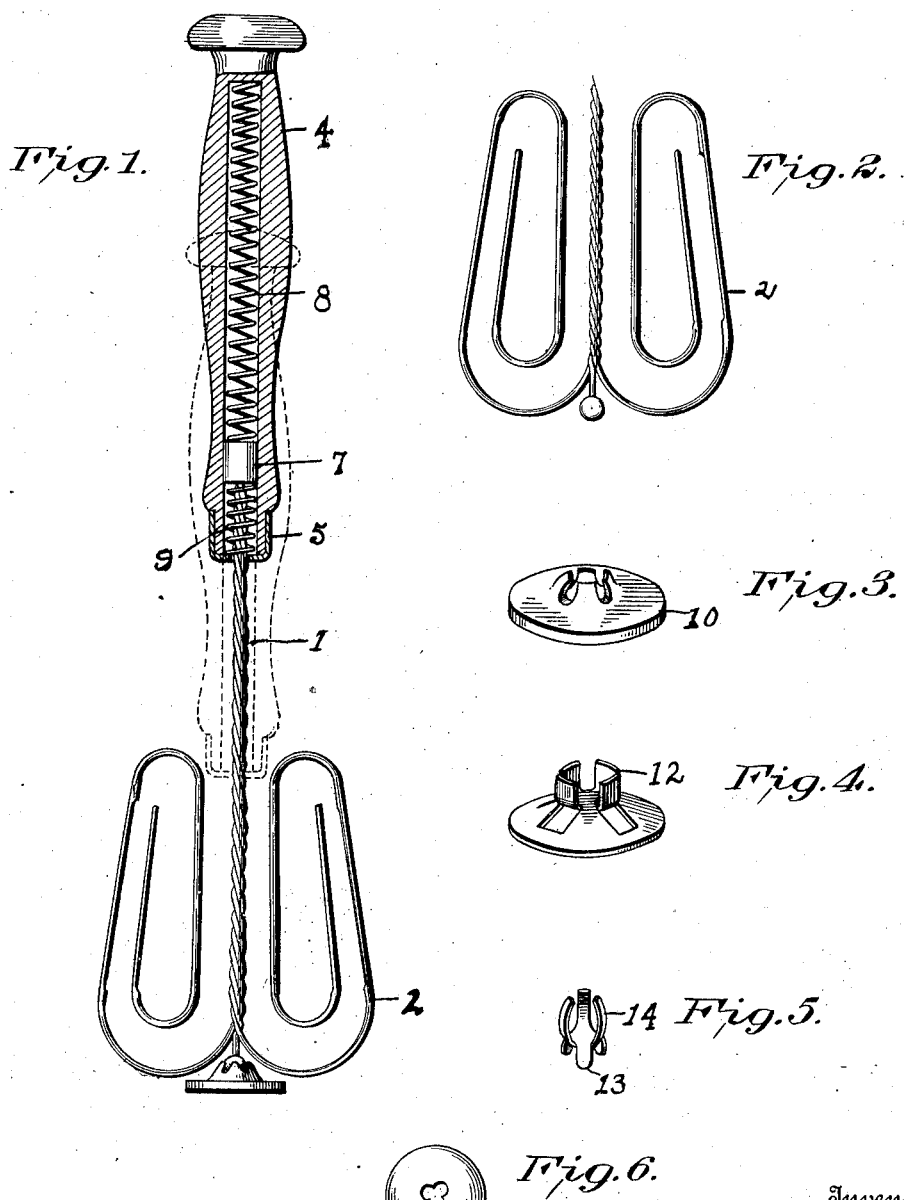

UNITED STATES PATENT OFFICE.

EDWARD H. JOHNSON, OF BINGHAMTON, NEW YORK, ASSIGNOR TO THE A. & J. MANUFACTURING CO., OF BINGHAMTON, NEW YORK.

IMPLEMENT FOR BEATING EGGS, WHIPPING CREAM, OR FOR MIXING INGREDIENTS.

1,025,982. Specification of Letters Patent. Patented May 14, 1912.

Application filed November 8, 1909. Serial No. 526,901.

*To all whom it may concern:*

Be it known that I, EDWARD H. JOHNSON, a citizen of the United States, residing at Binghamton, in the county of Broome and State of New York, have invented new and useful Improvements in Implements for Beating Eggs, Whipping Cream, or for Mixing Ingredients, of which the following is a specification.

This invention relates to improvements in implements for beating eggs, whipping cream, or for the mixing of ingredients where a rotary whirling or beating action is necessary, and the object is to provide a simple and inexpensive article of this character which may be readily operated and which performs its work in an effective manner.

With the above object in view, the invention consists in the novel features of construction hereinafter fully described, particularly pointed out in the claim, and clearly illustrated by the accompanying drawing, in which—

Figure 1 is a view partly in section and partly in side-elevation of an article constructed in accordance with my invention, dotted lines showing the handle in its lowermost position; Fig. 2, an elevation of the lower end of the implement without the base-member; Fig. 3, a perspective view of one form of base-member; Fig. 4, a similar view of a modified form of base-member; Fig. 5, also a perspective view of a further modification of base-member, and Fig. 6, a view of the ferrule showing the trifurcated opening formed therein to receive the spiral shaft.

As shown, the spiral-shaft 1 is formed by intertwisting a plurality of wires, two of which wires are bent to form beater-wings 2. The third wire projects below the wings and has secured thereto, a spherical member or ball 3. That portion of the wires forming the wings is flattened as shown so as to give the wings more cutting power so as to quickly and effectively cut or divide the material acted on.

4 designates the handle having at its lower-end, a ferrule 5 formed with a trifurcated opening 6 to receive the spiral-shaft. The upper end of the shaft which extends into the handle carries a cap 7 which forms a shoulder against which the spiral springs hereinafter referred to bear, and also as a guide for the handle in its movements on the shaft, serving to prevent play of the former on the latter. Positioned in the handle between the upper surface of the cap 7 and the upper end of handle, is a spiral-spring 8 which serves to return the handle to normal position after it has been pressed down on the shaft. Also positioned in the handle, between the under side of the cap 7 and the ferrule is a cushioning-spring 9.

A base-member may be provided for the beater, in the form of a disk 10 which is concaved on its under side so that it will rest securely in a dish or bowl which is raised at its center, and which is formed with a socket 11 to loosely confine the ball 3. The base-member shown in Figs. 1 and 3 is cast, while that shown in Fig. 4 is stamped out, confining-portions 12 for the ball being struck up from the metal forming the same. The base-member shown in Fig. 5 consists of the feet 13 to rest on the bowl or dish and the fingers 14 to receive and confine the ball.

Having thus fully described my invention, what I claim as new and desire to secure by Letters Patent of the United States, is:—

An article of manufacture comprising a rotatable vane-carrying shaft, a spherical member on the lower end of said shaft, a base formed from a sheet metal piece and slitted radially to form sections, adjacent sections being bent upwardly and downwardly respectively to form a socket and feet.

In testimony whereof I, affix my signature in the presence of two witnesses.

EDW. H. JOHNSON.

Witnesses:
HARMON J. KNEELAND,
LENA A. SHORE.